United States Patent
Gopalarathnam

(10) Patent No.: US 9,866,469 B2
(45) Date of Patent: Jan. 9, 2018

(54) SHUTDOWN RESPONSE SYSTEM

(71) Applicant: Dell Products L.P., Round Rock, TX (US)

(72) Inventor: Sudharsan Dhamal Gopalarathnam, Chennai (IN)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 14/715,260

(22) Filed: May 18, 2015

(65) Prior Publication Data

US 2016/0344617 A1 Nov. 24, 2016

(51) Int. Cl.
*H04L 12/707* (2013.01)
*H04L 12/703* (2013.01)
*H04L 12/939* (2013.01)

(52) U.S. Cl.
CPC ............. *H04L 45/22* (2013.01); *H04L 45/28* (2013.01); *H04L 49/555* (2013.01)

(58) Field of Classification Search
CPC ........ H04L 45/22; H04L 45/28; H04L 49/555
See application file for complete search history.

(56) References Cited

U.S. PATENT DOCUMENTS

2010/0157813 A1* 6/2010 Matsuura .............. H04L 41/06
 370/242
2016/0110263 A1* 4/2016 Tracht ................ G06F 11/1461
 714/6.23

* cited by examiner

*Primary Examiner* — Jianye Wu
(74) *Attorney, Agent, or Firm* — Haynes and Boone, LLP

(57) ABSTRACT

A shutdown response system includes a network with a first network device and a second network device. The first network device sends a first data traffic flow through the network along a first data path that includes the second network device. If the second network device determines that a shutdown condition is within a predetermined shutdown notification range of a predetermined shutdown threshold, it sends a first shutdown response notification to the first network device. The first network device receives the first shutdown response notification and, in response, determines and stores a second data path for sending the first data traffic flow through the network that does not include the second network device. In the event the second network device shuts down, the first network device immediately begins sending the first data traffic flow through the network along the second data path that does not include the second network device.

16 Claims, 13 Drawing Sheets

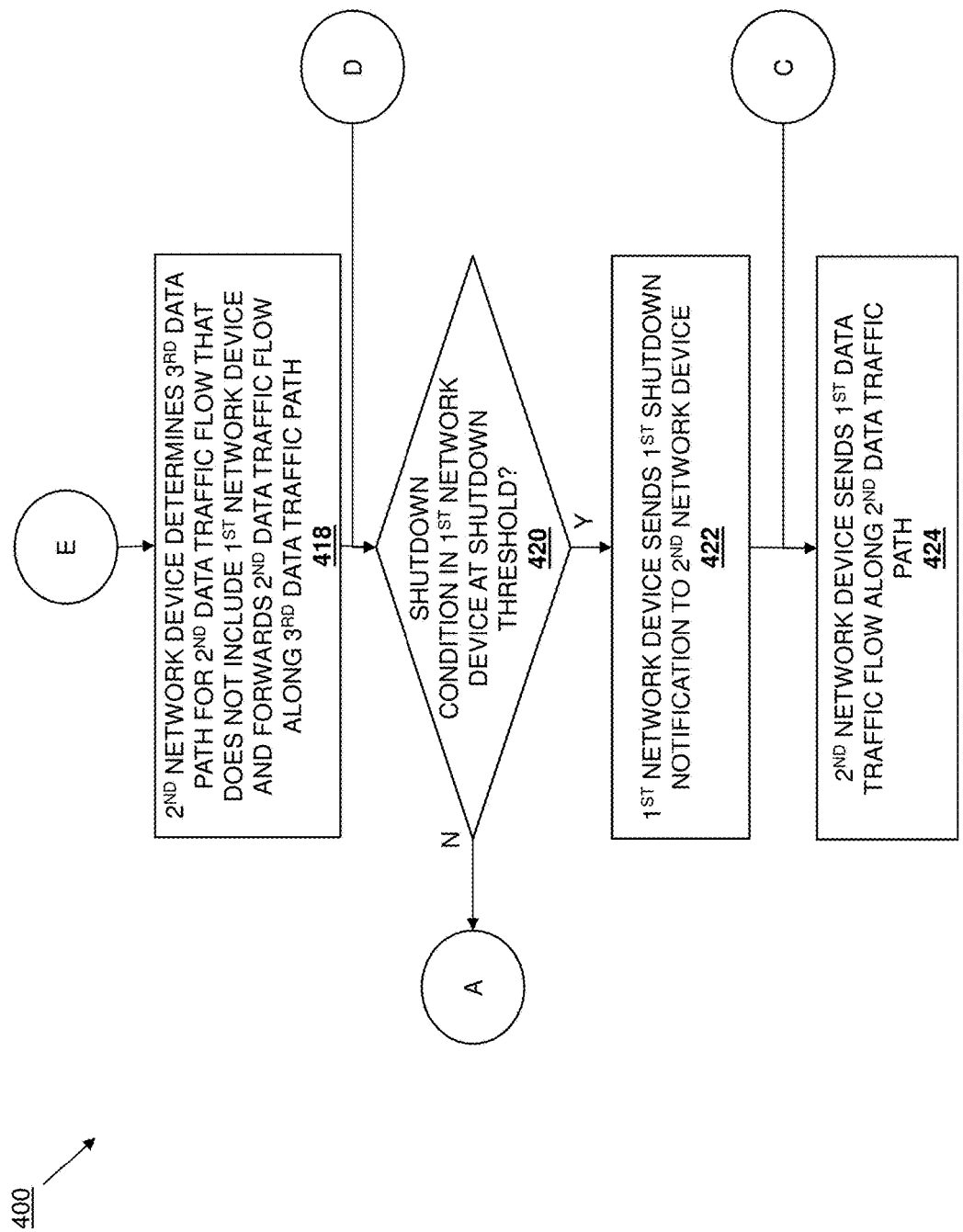

US 9,866,469 B2

SHUTDOWN RESPONSE SYSTEM

BACKGROUND

The present disclosure relates generally to information handling systems, and more particularly to a system for responding to the automatic shutdown of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, switches or other network devices, are configured to automatically shut down in response to the malfunctioning of components in the switch. For example, a switch may be configured to automatically shut down in response to detecting a temperature in the switch that is above a predetermined threshold. Conventionally, when a switch in a network automatically shuts down, data traffic that is being sent to that switch by other switches in the network must be rerouted. For example, subsequent to a first switch performing an automatic shutdown, one or more second switches in the network may learn of the shutdown of the first switch by determining that a link is down, experiencing a communication timeout, and/or a variety of other shutdown conditions known in the art, and those second switches may then recalculate the data path of their data traffic to its destination such that their data traffic may be sent to its destination without the use of the first switch. However, during the time period between the first switch automatically shutting down and the second switches beginning to send their data traffic along the recalculated data path that does not include the first switch, data traffic sent using paths that include the first switch is lost. Such data traffic disruptions require the resending of the data traffic, making the network less efficient.

Accordingly, it would be desirable to provide an improved shutdown response system.

SUMMARY

According to one embodiment, an information handling system (IHS) includes a communication system that is configured to couple to a network; a processing system that is coupled to the communication system; and a memory system that is coupled to the processing system and that includes instructions that, when executed by the processing system, cause the processing system to provide a shutdown response engine that is configured to: send, using the communication system, a first data traffic flow through the network along a first data path that includes a first network device that is coupled to the network; receive, using the communication system, a first shutdown response notification from the first network device through the network, wherein the first shutdown response is associated with a shutdown condition of the first network device being within a predetermined shutdown notification range of a predetermined shutdown threshold for the first network device; determine, in response to receiving the first shutdown response notification, a second data path for sending the first data traffic flow through the network that does not include the first network device; and store, in the memory system, the second data path.

BRIEF DESCRIPTION OF THE DRAWINGS

FIG. 4c is a portion of a flow chart illustrating an embodiment of a method for responding to a shutdown.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
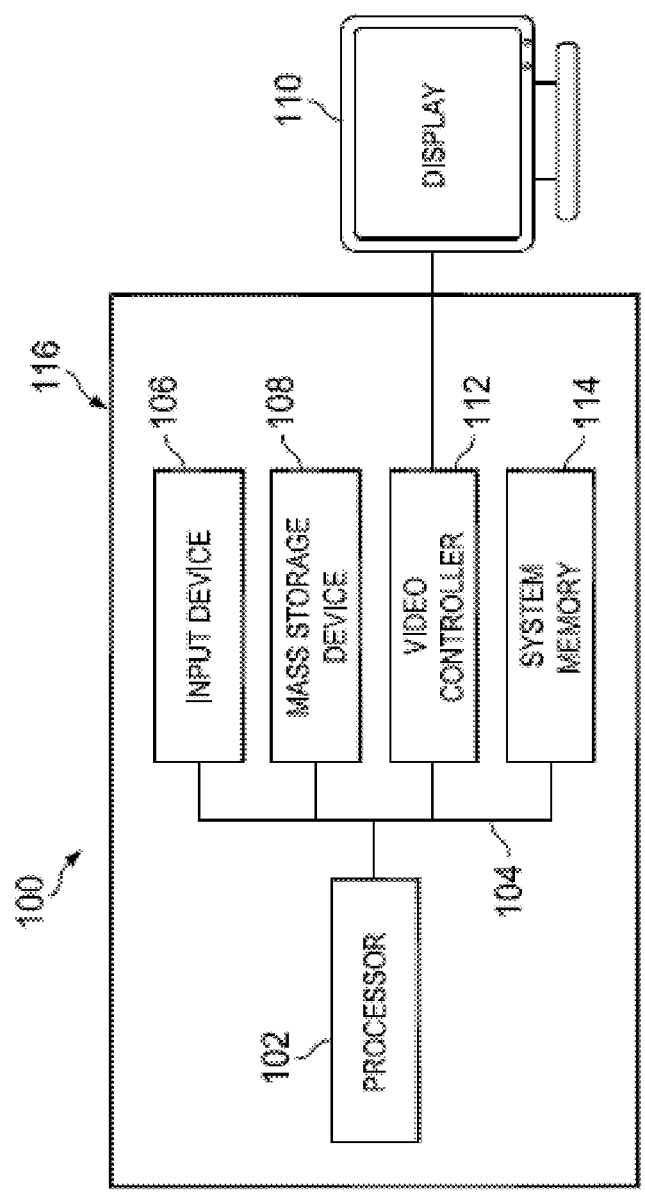
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
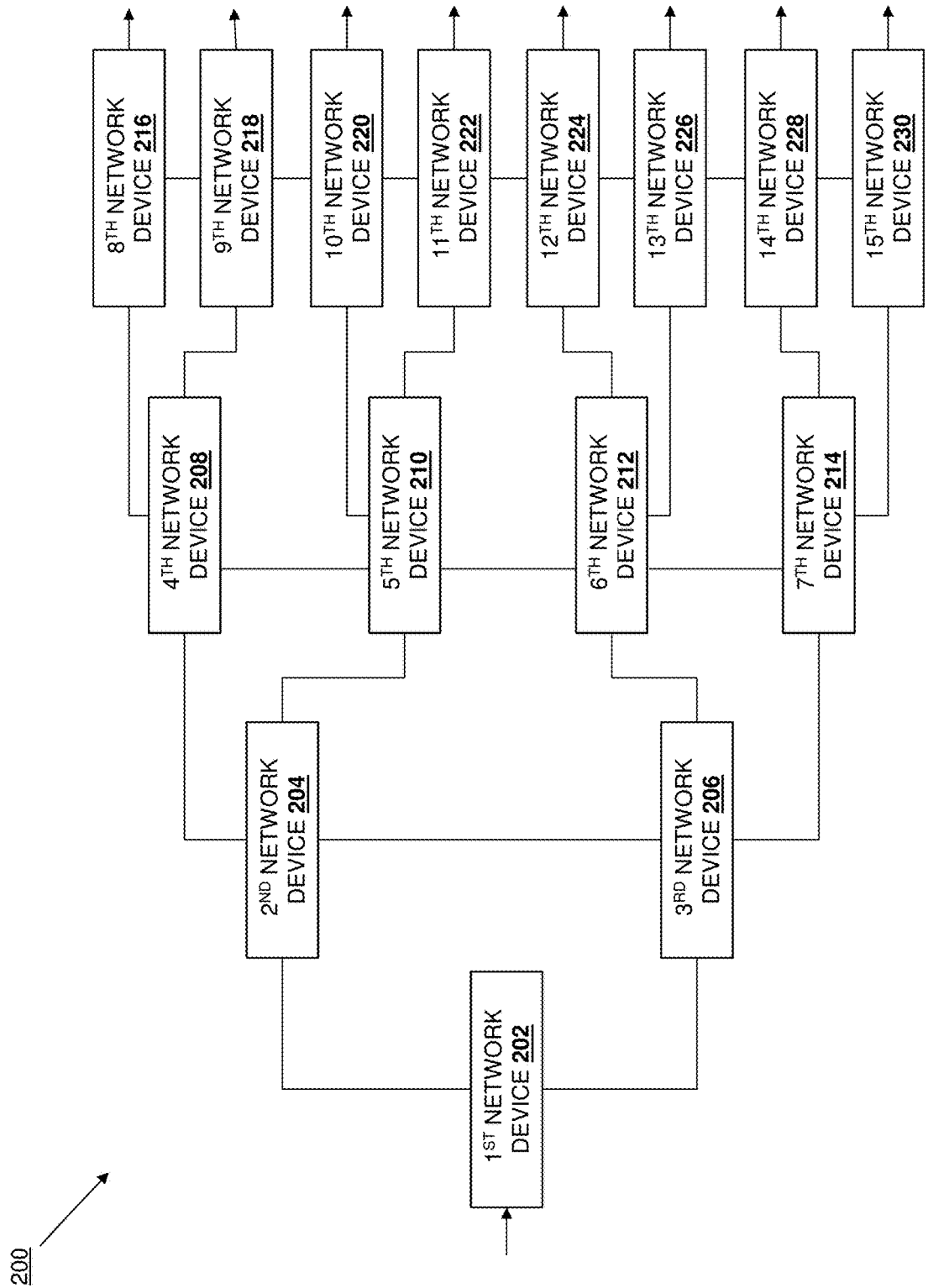
FIG. 2 is a schematic view illustrating an embodiment of a shutdown response system including a plurality of network devices.

Referring now to FIG. 2, an embodiment of a shutdown response system 200 is illustrated. In the illustrated embodiment, the shutdown response system 200 includes a portion of a network that includes a first network device 202 that is coupled to each of a second network device 204 and a third network device 206. The second network device 204 and the third network device 206 are coupled to each other, with the second network device 204 coupled to each of a fourth network device 208 and a fifth network device 210, and the third network device 206 coupled to each of a sixth network device 212 and a seventh network device 214. The fourth network device 208 and the fifth network device 210 are coupled together, the fifth network device 210 and the sixth network device 212 are coupled together, and the sixth network device and the seventh network device 214 are coupled together. In addition, the fourth network device 208 is coupled to each of an eighth network device 216 and a ninth network device 218, the fifth network device 210 is coupled to each of a tenth network device 220 and an eleventh network device 222, the sixth network device 212 is coupled to each of a twelfth network device 224 and a thirteenth network device 226, and the seventh network device 214 is coupled to each of a fourteenth network device 228 and a fifteenth network device 230. The eighth network device 216 and the ninth network device 218 are coupled together, the ninth network device 218 and the tenth network device 220 are coupled together, the tenth network device 220 and the eleventh network device 222 are coupled together, the eleventh network device 222 and the twelfth network device 224 are coupled together, the twelfth network device 224 and the thirteenth network device 226 are coupled together, the thirteenth network device 226 and the fourteenth network device 228 are coupled together, and the fourteenth network device 228 and the fifteenth network device 230 are coupled together.

One of skill in the art in possession of the present disclosure will recognize that that the arrow in FIG. 2 that is associated with the first network device 202 is indicative of data that may be received from a network device (not illustrated) that is coupled to the first network device 202. Similarly, the arrows in FIG. 2 that are associated with the eighth network device 216, the ninth network device 218, tenth network device 220, the eleventh network device 222, the twelfth network device 224, the thirteenth network device 226, the fourteenth network device 228, and the fifteenth network device 230 are indicative of data that may be forwarded from that network device to another network device (not illustrated). Furthermore, while the shutdown response system 200 illustrated in FIG. 2 includes a symmetrical configuration of network devices for clarity of discussion of the use of the shutdown response system 200 below, one of skill in the art in possession of the present disclosure will recognize that a wide variety of other configurations of network devices will fall within the scope of the present disclosure.

In the embodiments of the method of use of the shutdown response system 200 discussed below, data paths through the shutdown response system 200 via some of the network devices 202-230 may be described using the couplings between those network devices using the convention "coupling (network device at first end of the coupling)/(network device at the second end of the coupling)". As such, the coupling between the first network device 202 and the second network device 204 may be referred to as coupling 202/204, the coupling between the second network device 204 and the fifth network device 210 may be referred to as coupling 204/210, and so on. While the network devices 202-230 are described below as network devices such as switches or routers, other network computing systems that are configured to receive and forward, generate and forward, receive and generate, or otherwise transmit data traffic are envisioned as falling within the scope of the present disclosure.

Figure 3:
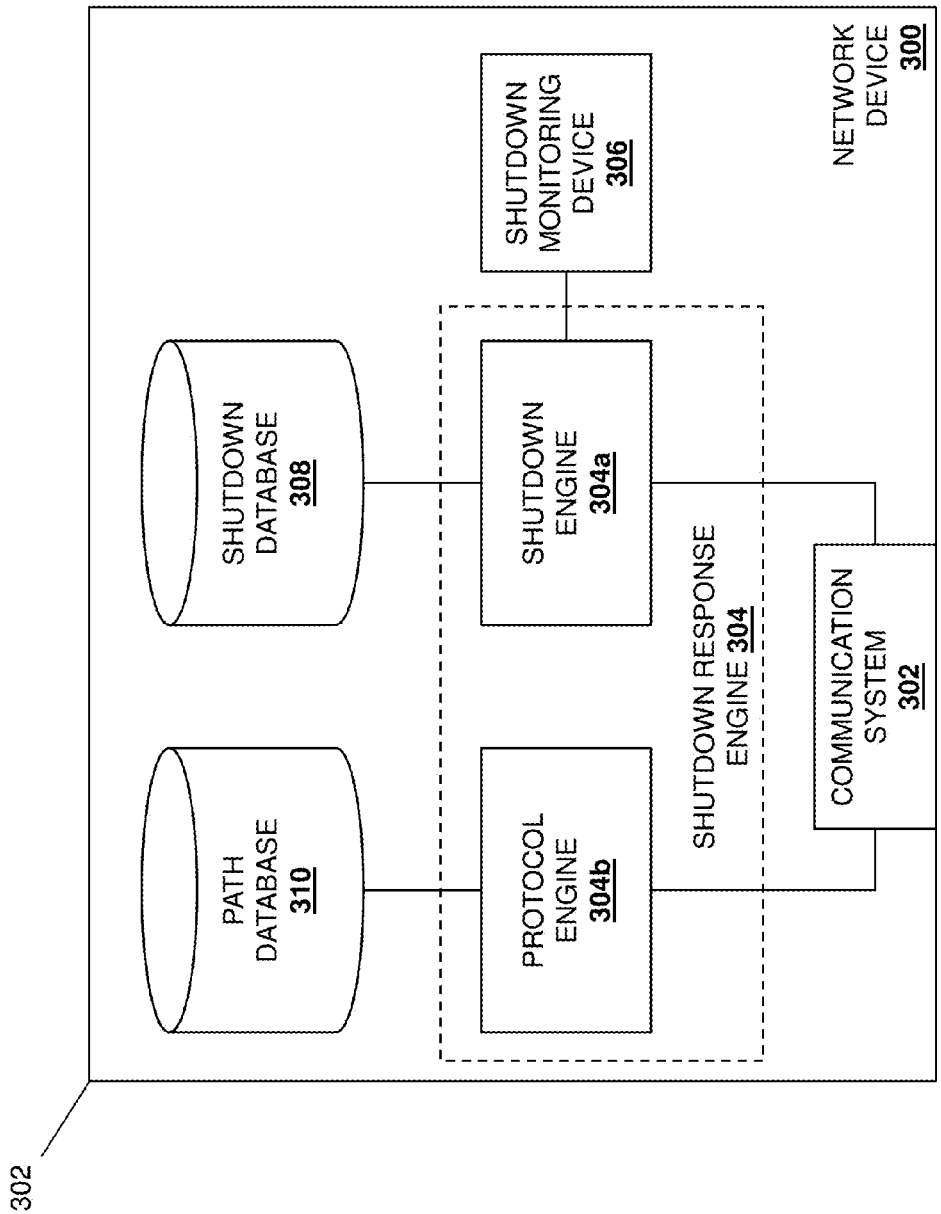
FIG. 3 is a schematic view illustrating an embodiment of a network device used in the shutdown response system of FIG. 2.

Referring now to FIG. 3, an embodiment of a network device 300 is illustrated. In an embodiment, the network device 300 may be the IHS 100 discussed above with reference to FIG. 1 and/or may include some or all of the components of the IHS 100. In an embodiment, the network device 300 may be any of the network devices 202-230 discussed above with reference to FIG. 2. In the discussion of the use of the shutdown response system 200 below, the network device 300 described as a switch or router that is provided as a plurality of the network devices in the shutdown response system 200. However, as discussed above, the network device 300 may provide other network computing systems that are configured to receive and forward, generate and forward, receive and generate, or otherwise transmit data traffic while remaining within the scope of the present disclosure. The network device 300 includes a chassis 302 that houses the components of the network device 300. A communication system 304 is included in and/or on the chassis 302 and may include a variety of communication system components such as, for example, a Network Interface Controller (NIC), ports, wireless communication devices, and/or a variety of other communication system components known in the art. In an embodiment, the communication system 302 may be utilized in coupling the network device 300 to other network devices (as illustrated for the network devices 202-300 in FIG. 2).

The chassis 302 also may house a processing system (not illustrated, but which may be substantially similar to the processor 102 discussed above with reference to FIG. 1) and a memory system (not illustrated, but which may be substantially similar to the system memory 114 discussed above with reference to FIG. 1) that includes instructions that, when executed by the processing system, cause the processing system to provide a shutdown response engine 304 that is configured to perform the functions of the shutdown response engines and/or network devices discussed below. In the illustrated embodiment, the shutdown response engine 304 includes two components: a shutdown engine 304a that is configured to detect and respond to the variety of shutdown situations detailed below as well as perform any of the other functions of the shutdown engines discussed below, and a protocol engine 304b that is configured to determine data paths as well as perform any of the other functions of the protocol engines and/or network devices discussed below. Each of the shutdown engine 304a and the protocol engine 304b in the shutdown response engine 304 are coupled to the communication system 302 (e.g., via a coupling between the processing system and the communication system 302).

A shutdown monitoring device 306 is housed in the chassis 302 and coupled to the shutdown engine 304 (e.g., via a coupling between the processing system and the shutdown monitoring device 306). In an embodiment, the shutdown monitoring device 306 may include a temperature sensor, a data transmission monitoring device, a data error monitoring device, and/or a variety of other shutdown monitoring devices known in the art. A shutdown database 308 is housed in the chassis 302 and may be provided on a storage device (not illustrated, but which may be the storage device 108 discussed above with reference to FIG. 1). The shutdown database 308 is coupled to the shutdown engine 304a (e.g., via a coupling between the processing system and the storage device) and, as discussed below, may include shutdown details for the variety of shutdown situations discussed below. In an embodiment, the shutdown details may be predetermined shutdown details that are determined and stored in the shutdown database 308 by a manufacturer of the network device 300, determined and stored in the shutdown database 308 by an administrator of the network device 300, determined and stored in the shutdown database 308 by the network device 300 during operation based on any of a variety of current operating conditions, and/or determined in a variety of other manners known in the art and stored in the shutdown database 308.

For example, shutdown details in the shutdown database 308 may include one or more shutdown conditions such as, for example, a temperature shutdown condition, a data transmission shutdown condition, a data error condition, an excessive pause frame condition, an excessive priority flow control frame (PFC) condition, and/or a variety of other shutdown conditions known in the art. In addition, shutdown details in the shutdown database 308 may include shutdown thresholds for each of the one or more shutdown conditions such as, for example, temperature shutdown threshold(s) for the temperature shutdown condition (e.g., a maximum and/or minimum temperature), a data transmission shutdown threshold for the data transmission shutdown condition (e.g., a minimum data transmission rate), a data error shutdown threshold for the data error shutdown condition (e.g., a maximum data error rate), an excessive pause frame shutdown threshold for an excessive pause frame condition (e.g., a maximum pause frame rate), an excessive PFC shutdown threshold for an excessive PFC condition (a maximum PFC rate), and/or a variety of other shutdown thresholds known in the art. In addition, shutdown details in the shutdown database 308 may include shutdown notification ranges for each of the shutdown thresholds such as, for example, temperature ranges(s) for the temperature shutdown threshold(s) (e.g., a temperature range adjacent the maximum and/or minimum temperature), a data transmission range for the data transmission shutdown threshold (e.g., a data transmission range adjacent the minimum data transmission rate), a data error range for the data error shutdown threshold (e.g., a data error range adjacent the maximum data error rate), a pause frame range for the excessive pause frame shutdown threshold (e.g., a pause frame range adjacent the maximum pause frame rate), a PFC rate range for the excessive PFC shutdown threshold (e.g., a PFC range adjacent the maximum PFC rate), and/or other ranges that may correspond to thresholds used in the shutdown response system of the present disclosure.

A path database 310 is housed in the chassis 302 and may be provided on a storage device (not illustrated, but which may be the storage device 108 discussed above with reference to FIG. 1). The path database 310 is coupled to the protocol engine 304b (e.g., via a coupling between the processing system and the storage device) and, as discussed below, may include path details for determining the data paths discussed below. For example, path details in the path database 310 may include routing protocol instructions, a topology of the shutdown response system 200, details about the network devices 202-230, current paths for data traffic to its destination(s) that are currently programmed in hardware, and/or a variety of other path details known in the art. While the shutdown database 308 and the path database 310 are illustrated and described as being provided on separate storage devices that are housed in the chassis 302, the shutdown database 308 and the path database 310 may be provided on a common storage device and/or housed outside of the chassis 302 (e.g., coupled to the shutdown response engine 304 through the communication system 304 via a network) while remaining within the scope of the present disclosure.

Figure 4A:
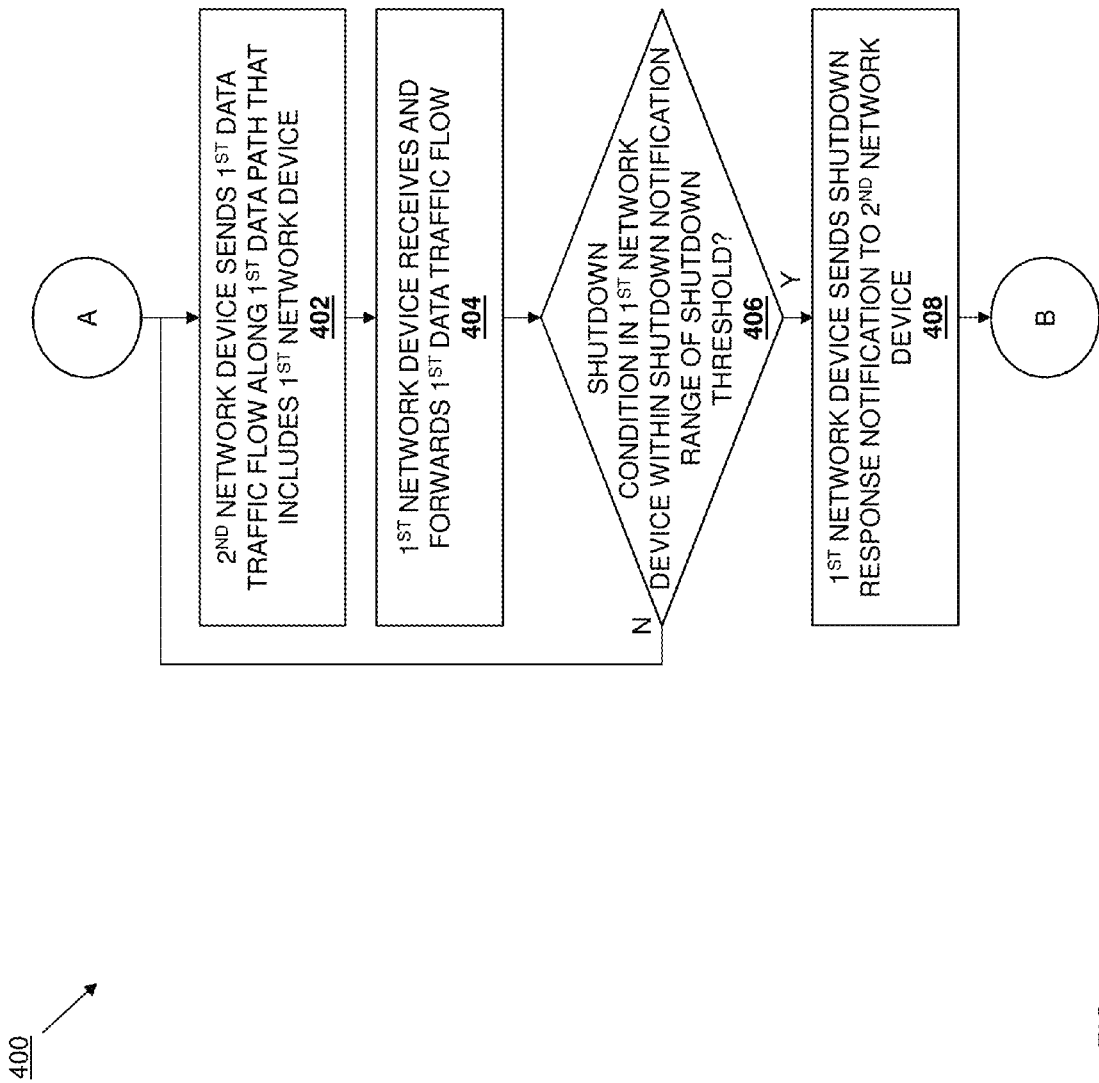
FIG. 4a is a portion of a flow chart illustrating an embodiment of a method for responding to a shutdown.
Figure 4B:
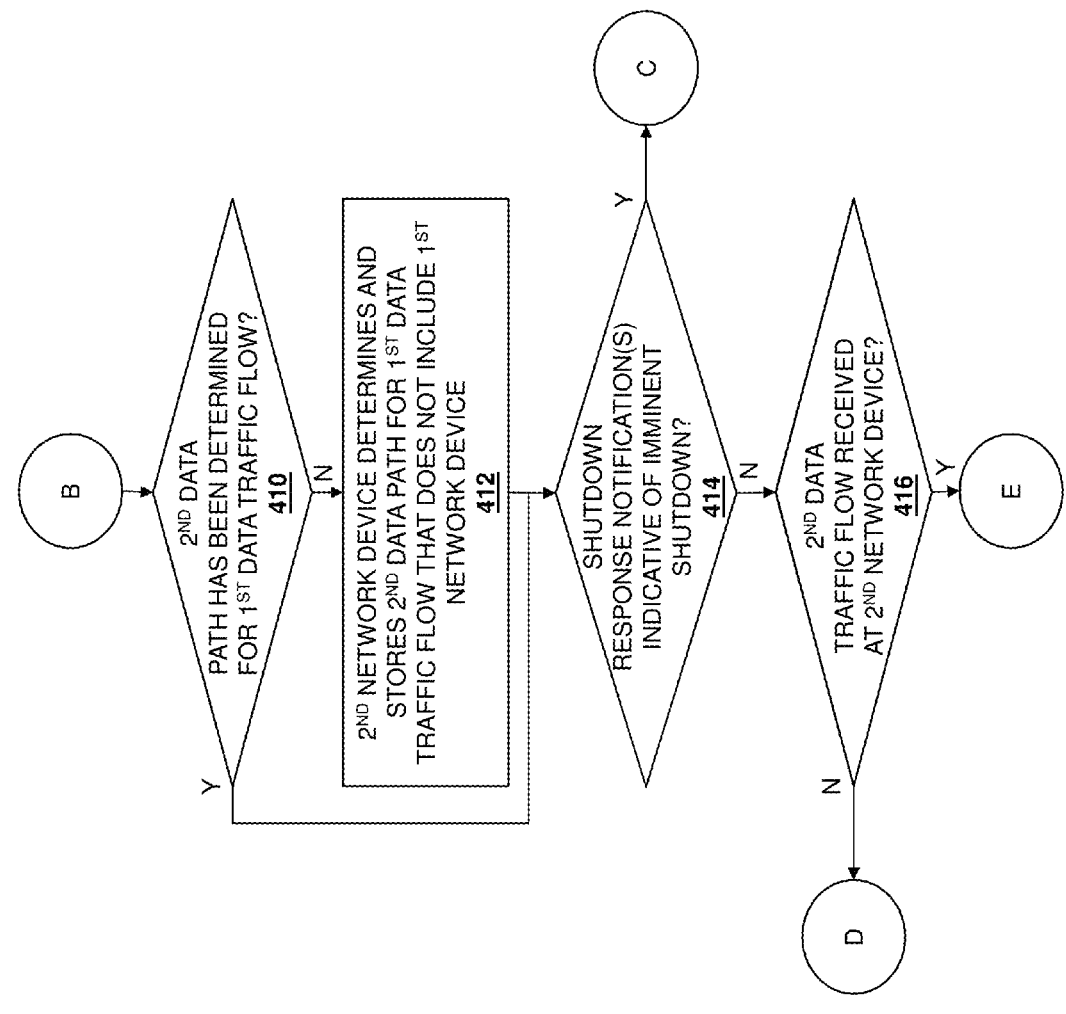
FIG. 4b is a portion of a flow chart illustrating an embodiment of a method for responding to a shutdown.

Referring now to FIGS. 4a-4c, and with reference to FIGS. 5a-5e, an embodiment of a method 400 for responding to a shutdown is illustrated. As discussed in further detail below, the method 400 provides for network devices in the shutdown response system 200 of FIG. 2 to notify other network devices in the shutdown response system 200 of shutdown conditions prior to those shutdown conditions reaching a shutdown threshold. Second network devices in the shutdown response system 200 may send data traffic flows along current data paths that include a first network device. The first network device is configured to determine when it is experiencing a shutdown condition that is within a shutdown notification range of a shutdown threshold that still allows it to operate and, in response, notify the second network devices of such with a shutdown response notification. In response to being notified of the shutdown condition in the first network device prior to that shutdown condition reaching the shutdown threshold, the second network devices may determine alternate data paths for the data traffic flows that do not include the first network device, and store those alternate data paths. Those second network devices may then continue to forward the data traffic flows along the current data paths through the first network device until a shutdown notification is received from the first network device upon the shutdown condition reaching the shutdown threshold, or the shutdown notifications received prior to the shutdown condition reaching the shutdown threshold are indicative of an imminent shutdown of the first network device.

In response to the shutdown notification of the shutdown condition reaching a shutdown threshold, or the determination of the imminent shutdown of the first network device, the second network devices may then start sending the data traffic flows along the alternate data paths that do not include the first network device. The determination of those alternate data paths prior to the shutdown or imminent shutdown of the first network device allows for the data paths of data traffic flows to be switched quickly when the shutdown condition in the first network device reaches its shutdown threshold, reducing data traffic losses relative to conventional shutdown response systems. Furthermore, the second network device(s) may make data traffic flow routing decisions based on the shutdown response notifications from the first network device such as, for example, sending newly received data traffic flows along data paths that do not include the first network device when the first network device is operating but also sending shutdown response notifications in response to a shutdown condition being within a shutdown notification range of their shutdown threshold.

Figure 5A:
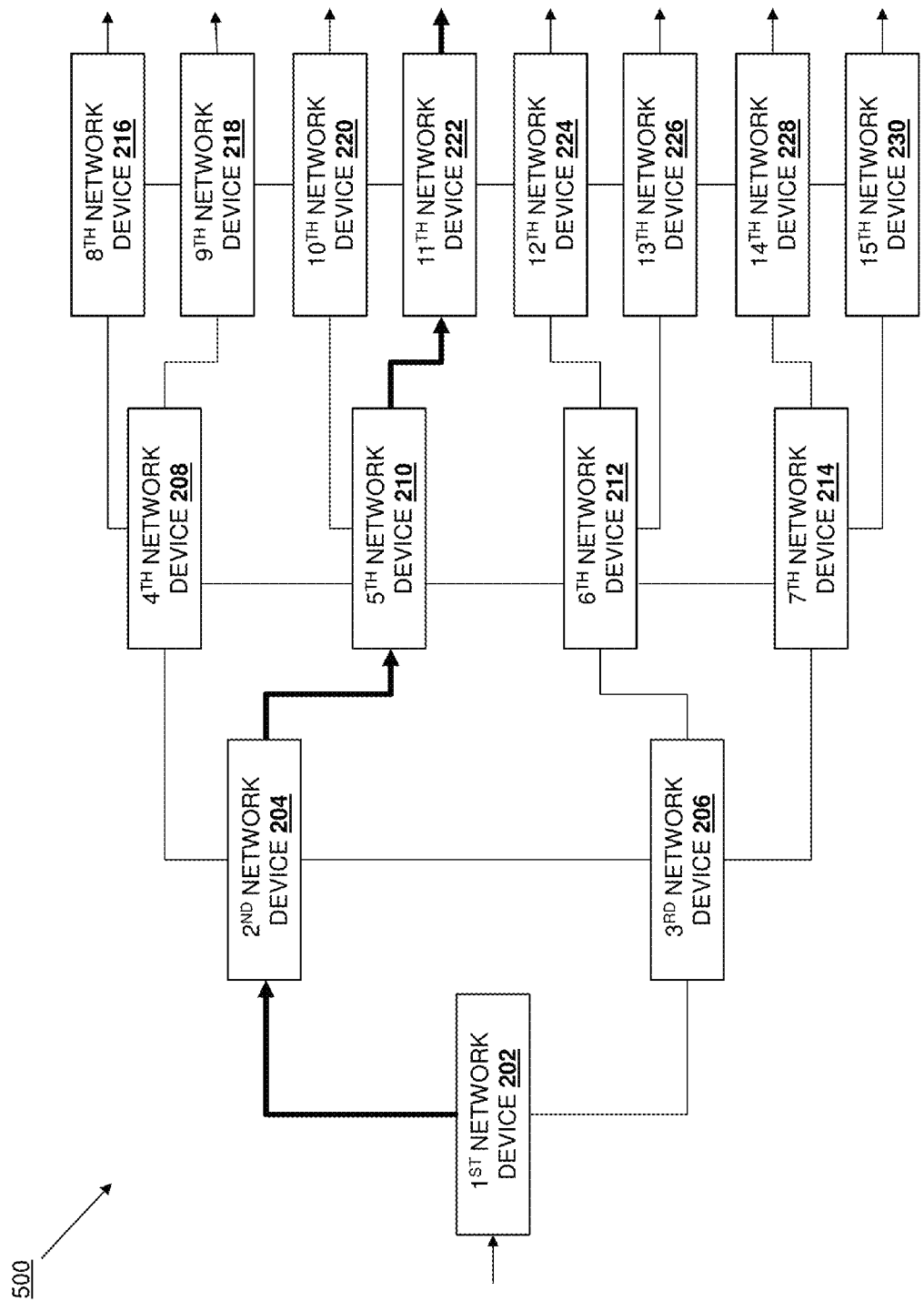
FIG. 5a is a schematic view illustrating a first data path through the shutdown response system of FIG. 2.

Referring first to FIG. 4a, and with reference to FIG. 5a, the method 400 begins at block 402 where a second network device sends a first data traffic flow along a first data traffic path that includes a first network device. For example, FIG. 5a illustrates the first network device 202 receiving (or generating) a first data traffic flow and sending that first data traffic flow along a first data path 500 that includes the coupling 202/204, the second network device 204, the coupling 204/210, the fifth network device 210, the coupling 210/222, and the eleventh network device 222 such that the eleventh network device 222 sends that first data traffic flow on to its destination. In different embodiments, the first data traffic flow may be received by the first network device 202 from a source device, another network device (e.g., a switch or router), and/or a variety of other devices known in the art. In different embodiments, the first data traffic flow may be an application flow (e.g., data generated and sent by an application running on a network device), other data generated by a source device, and/or a variety of data traffic known in the art.

In an embodiment, the protocol engine 304b in the first network device 202/300 operates to receive the first data traffic flow through the communication system 302, determine the first data path 500 using information retrieved from the packets in the first data traffic flow and information (e.g., topology information about the network and/or shutdown response system 200) in the path database 310, and send the first data traffic flow along the first data path 500. For example, the protocol engine 304b may use protocols such as, for example, the Shortest Path First (SPF) protocol, the Open Shortest Path First (OSPF) protocol, the Border Gateway Protocol (BGP), the Spanning Tree Protocol (STP) and/or its variants, and/or a variety of other topology-based routing protocols known in the art, in order to determine the data paths for data traffic flows as described herein. In the examples provided below, different network devices 202-230 in the shutdown response system 200 are described as operating as the "first network device" that is experiencing a shutdown condition and the "second network device" that is responding to the shutdown condition in the first network device, and one of skill in the art in possession of the present disclosure will recognize that each of those network devices may include similar functionality to detect and response shutdown conditions, determine alternate data paths for data traffic flows, and use of those alternate data paths when shutdown thresholds are reached (or shutdown is otherwise imminent) in any of the network devices 202-230.

The method 400 then proceeds to block 404 where the first network device receives and forwards the first data traffic flow. For example, FIG. 5a illustrates the second network device 204 (as well as the fifth network device 210 and the eleventh network device 222) receiving the first data traffic flow that was sent along the first data path 500 and forwarding it. It should be understood that, using the example illustrated in FIG. 5a, each of the network devices 204, 210, and 222 may act as "first network devices" in forwarding the first data traffic flow, as well as "second network devices" in sending the first data traffic flow along a data path and determining alternate data paths for that first data traffic flow as described in further detail below.

The method 400 then proceeds to decision block 406 where it is determined whether a shutdown condition in the first network device is within a shutdown notification range of a shutdown threshold. With reference to FIG. 5a, as discussed above, the shutdown database 308 in the second network device 204/300 may include shutdown details about a variety of shutdown conditions such as, for example, a temperature shutdown condition, a data transmission shutdown condition, a data error shutdown condition, an excessive pause frame condition, an excessive priority flow control frame (PFC) condition. In addition, the shutdown database 308 associates shutdown thresholds with each shutdown conditions such as, for example, temperature shutdown threshold(s) for the temperature shutdown condition (e.g., a maximum and/or minimum temperature), a data transmission shutdown threshold for the data transmission shutdown condition (e.g., a minimum data transmission rate), a data error shutdown threshold for the data error shutdown condition (e.g., a maximum data error rate), an excessive pause frame shutdown threshold for an excessive pause frame condition (e.g., a maximum pause frame rate), an excessive PFC shutdown threshold for an excessive PFC condition (a maximum PFC rate), and/or a variety of other shutdown thresholds known in the art. In addition, the shutdown database 308 associates shutdown notification ranges with each of the shutdown thresholds such as, for example, temperature ranges(s) for the temperature shutdown threshold(s) (e.g., a temperature range adjacent the maximum and/or minimum temperature), a data transmission range for the data transmission threshold (e.g., a data transmission range adjacent the minimum data transmission rate), a data error range for the data error threshold (e.g., a data error range adjacent the maximum data error rate), a pause frame range for the excessive pause frame shutdown threshold (e.g., a pause frame range adjacent the maximum pause frame rate), a PFC rate range for the excessive PFC shutdown threshold (e.g., a PFC range adjacent the maximum PFC rate), and/or other ranges used in the second network device 204/300.

In a specific example, the second network device 204/300 may be a switch that includes temperature shutdown condition (e.g., a temperature anywhere within the switch, a temperature associated with a component of the switch such as a power supply or a port, a temperature associated with a component coupled to a switch (e.g., a port extender or an optical device), etc.) with a temperature shutdown threshold of 85° Celsius, and a temperature shutdown notification range of 5°. In another specific example, the second network device 204/300 may be a switch that includes data transmission shutdown condition (e.g., a data transmission rate for entire switch, a data transmission rate associated with any port on the switch, a data transmission rate associated with a component coupled to a switch (e.g., a port extender or a optical device), etc.) with a data transmission shutdown threshold of X packets per second, and a data transmission shutdown notification range of X-Y packets per second where Y is a relatively small threshold that will allow for path recalculation prior to shut down. In another specific example, the second network device 204/300 may be a switch that includes data error shutdown condition associated with receiving Priority Flow Control (PFC) frames at a particular rate, or detecting data errors at a particular rate (e.g., data error(s) for entire switch, a data error(s) associated with any port on the switch, a data error(s) associated with a component coupled to a switch (e.g., a port extender or a optical device), etc.), and may associated the data error shutdown condition with a data error shutdown threshold and a data error shutdown notification range. While a few examples have been provided, one of skill in the art in possession of the present disclosure will recognize that any of a variety of shutdown conditions may be checked and determined whether they are within associated shutdown notification ranges of their shutdown thresholds at decision block 406 while remaining within the scope of the present disclosure.

At decision block 406, the shutdown engine 304a in the second network device 204/300 may communicate with the shutdown monitoring device 306 to receive or retrieve shutdown monitoring data, and use the shutdown details in the shutdown database 308 discussed above to determine whether the shutdown monitoring data indicates that the second network device 204/300 is within the shutdown notification range of its shutdown threshold. If the shutdown engine 304a determines that the shutdown monitoring data indicates that the second network device 204/300 is not within the shutdown notification range of its shutdown threshold, the method 400 returns to blocks 402 and 404 where the network devices operate as described above by sending, receiving, and forwarding the first data traffic flow along the first data path 500 as long as the second network device 204 is not within the shutdown notification range of its shutdown threshold. If the shutdown engine 304a determines that the shutdown monitoring data indicates that the second network device 204/300 is within the shutdown notification range of its shutdown threshold, the method 400 proceeds to block 408, discussed in further detail below.

In an embodiment, at decision block 406 the shutdown engine 304a may poll a temperature shutdown monitoring device 306 (e.g., a temperature sensor) to retrieve temperature shutdown monitoring data (e.g., a current temperature of the switch, a component in the switch, or a component coupled to the switch), and then compare that temperature shutdown monitoring data to the temperature shutdown condition(s) in the shutdown database 308. If the shutdown engine 304a determines that the temperature shutdown monitoring data falls within the temperature shutdown notification range of the temperature shutdown threshold of the second network device 204/300, the method 400 proceeds to block 408. Using the example discussed above, if the shutdown engine 304a retrieves a temperature of the switch, a component in the switch, or a component coupled to the switch that is 80° Celsius (i.e., within 5° Celsius of the 85° Celsius shutdown range), the method 400 proceeds to block 408.

In an embodiment, at decision block 406 the shutdown engine 304a may poll a data transmission shutdown monitoring device 306 (e.g., a port monitor) to retrieve data transmission shutdown monitoring data (e.g., a data transmission rate of the switch, a port in the switch, or a port coupled to the switch), and then compare that data transmission shutdown monitoring data to the data transmission shutdown condition(s) in the shutdown database 308. If the shutdown engine 304a determines that the data transmission shutdown monitoring data falls within the data transmission shutdown notification range of the data transmission shutdown threshold of the second network device 204/300, the method 400 proceeds to block 408. Using the example discussed above, if the shutdown engine 304a retrieves a data transmission rate of the switch, a port in the switch, or a port coupled to the switch that is within the shutdown range, the method 400 proceeds to block 408.

In an embodiment, at decision block 406 the shutdown engine 304a may poll a data error shutdown monitoring device 306 (e.g., a port monitor) to retrieve data error shutdown monitoring data (e.g., a data error rate of the switch, a port in the switch, or a port coupled to the switch), and then compare that data error shutdown monitoring data to the data error shutdown condition(s) in the shutdown database 308. If the shutdown engine 304a determines that the data error shutdown monitoring data falls within the data error shutdown notification range of the data error shutdown threshold of the second network device 204/300, the method 400 proceeds to block 408. Using the example discussed above, if the shutdown engine 304a retrieves a data error rate of the switch, a port in the switch, or a port coupled to the switch that is within the shutdown range), the method 400 proceeds to block 408. While the shutdown engine 304a is discussed as polling the shutdown monitoring device 306, the shutdown monitoring device 306 may actively report shutdown monitoring data to the shutdown engine 304a while remaining within the scope of the present disclosure.

At block 408, the first network device sends a shutdown response notification to the second network device. In an embodiment, in response to determining that the shutdown condition in the second network device 204/300 is within the shutdown notification range of its shutdown threshold, the shutdown engine 304a sends a shutdown response notification through the communication system 302 to the first network device 202 (e.g., via the coupling 202/204). The shutdown response notification may include an indication that the shutdown condition is within a shutdown notification range of a shutdown threshold, the shutdown monitoring data, the shutdown threshold, the shutdown notification range, an identifier for the data traffic flow being received and forwarded (e.g., an identifier for the first data traffic flow being received and forwarded by the second network device 204) and/or any other information related to the shutdown condition for which the shutdown response notification is being sent. In an embodiment, the shutdown response notification may be sent using protocols such as, for example, the Link Layer Discovery Protocol (LLDP), the Link Aggregation Control Protocol (LACP), and/or using a variety of other protocol or communication methods known in the art. For example, the information in the shutdown response notification may be sent in a Type-Length-Value (TLV) element of the data communication protocol used to send the shutdown response notification. At block 408, the first network device 202 receives the shutdown response notification.

Referring now to FIG. 4b, the method 400 then proceeds to decision block 410 where it is determined whether a second data path has been determined for the first data traffic flow. In an embodiment, at decision block 410, the protocol engine 304b in the first network device 202/300 receives the shutdown response notification through the communication system 302 and uses the information in the shutdown response notification to determine whether a second data path has been created for the first data traffic flow and stored in the path database 310. As discussed below, the first network device 202/300 may determine and store alternate data paths for data traffic flows in the path database 310 when shutdown response notifications are received from network devices through which those data traffic flows are sent, and at decision block 410 the first network device 202/300 determines whether an alternate data path has already been determined for the first data traffic flow and stored in the path database 310 (e.g., according to block 412 discussed below) such that an additional alternate data path is not created and stored in the path database 310 when an alternate data path already exists (i.e., an alternate data path that was created and stored for the first data traffic flow in response to receiving a previous shutdown response notification). If at decision block 410, the protocol engine 304b determines that a second data path has already been determined for the first data traffic flow, the method 400 proceeds to decision block 414, discussed in further detail below.

Figure 5B:
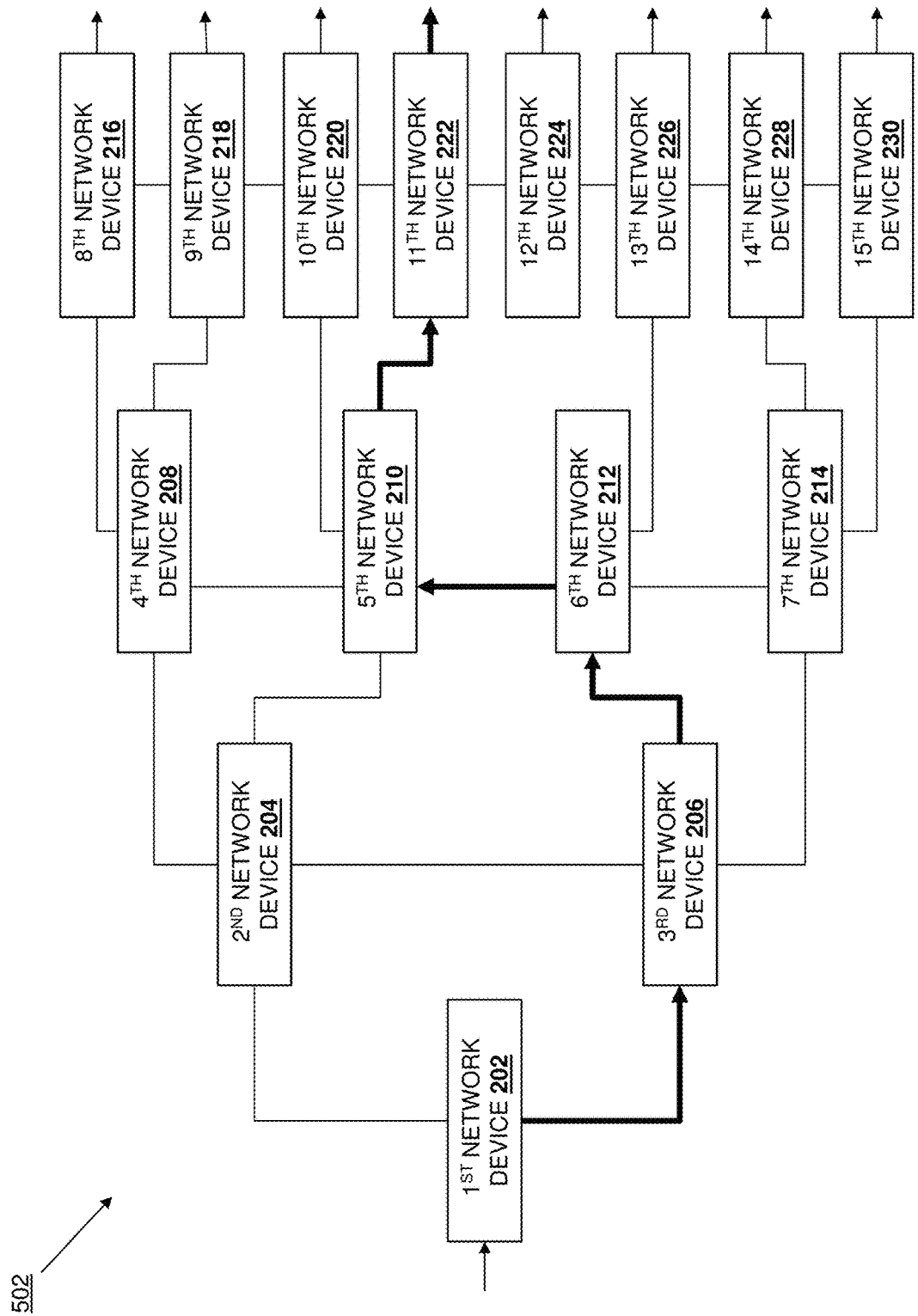
FIG. 5b is a schematic view illustrating an embodiment of a second data path through the shutdown response system of FIG. 2.

With reference to FIG. 5b, if it is determined that a second data path has not already been determined for the first data traffic flow, the method 400 proceeds to block 412 where the second network device maps, programs, and/or otherwise determines and stores a second data path for the first data traffic flow that does not include the first network device. In an embodiment, at block 412 the protocol engine 304b in the first network device 202 may operate to determine the second data path 502 for the first data traffic flow using information retrieved from the packets in the first data traffic flow and information (e.g., topology information about the network and/or shutdown response system 200) in the path database 310, and store the second data path 502 in the path database 310. As discussed above, the protocol engine 304b may use protocols such as, for example, the SPF protocol, the OSPF protocol, the BGP, the STP and/or its variants, and/or a variety of other topology-based routing protocols known in the art, in order to determine the data paths for data traffic flows as described herein. For example, FIG. 5b illustrates the second data path 502 from the first network device 202 that includes the coupling 202/206, the third network device 206, the coupling 206/212, the sixth network device 212, the coupling 212/210, the fifth network device 210, the coupling 210/222, and the eleventh network device 222 (which is configured to send that first data traffic flow onto its destination). As can be seen, the second data path 502 does not include the second network device 204 such that, if the second network device is to shut down, data or packets in data traffic flows sent along the second data path 502 will not be lost.

Figure 5C:
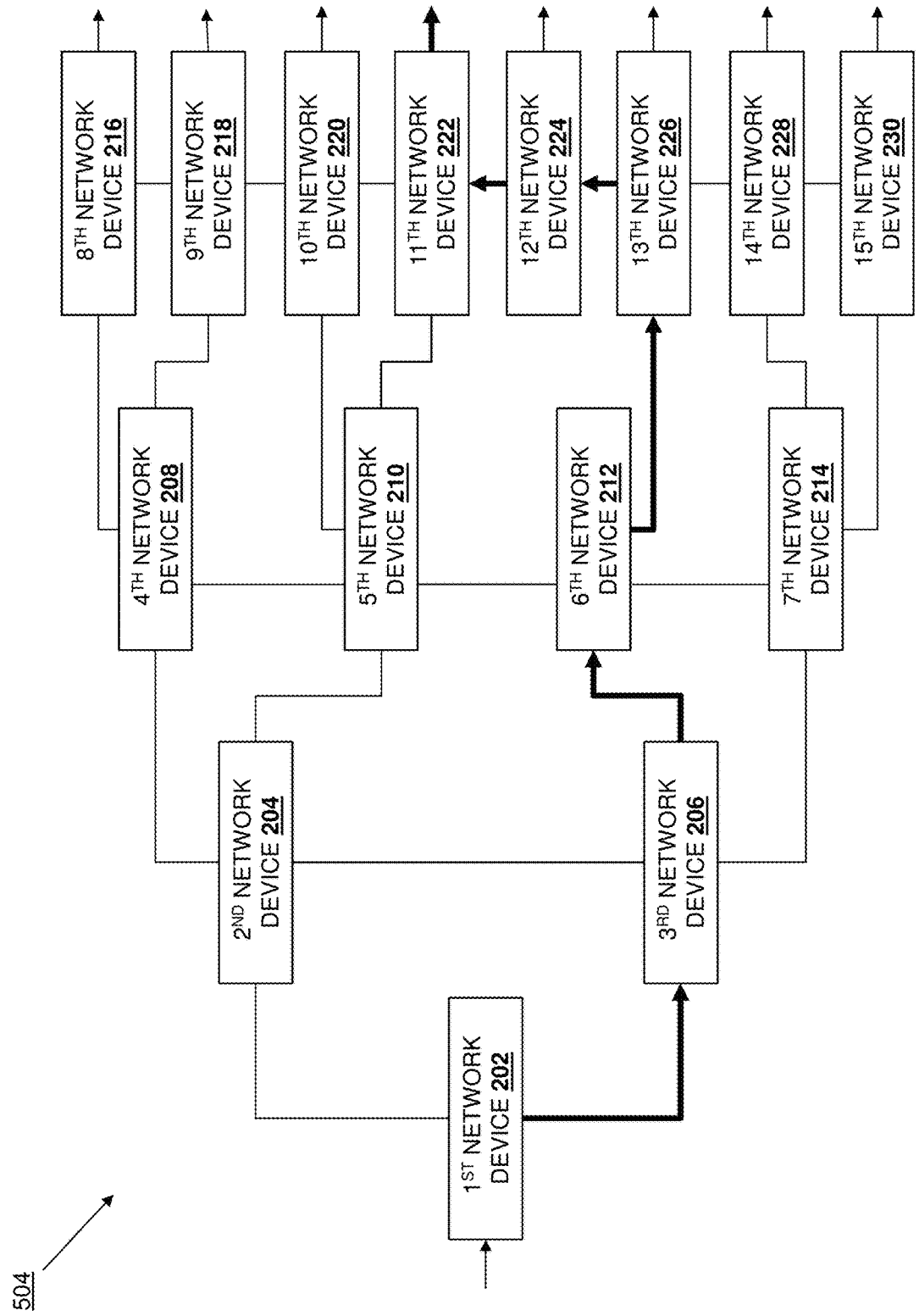
FIG. 5c is a schematic view illustrating an embodiment of a third data path through the shutdown response system of FIG. 2.
Figure 5D:
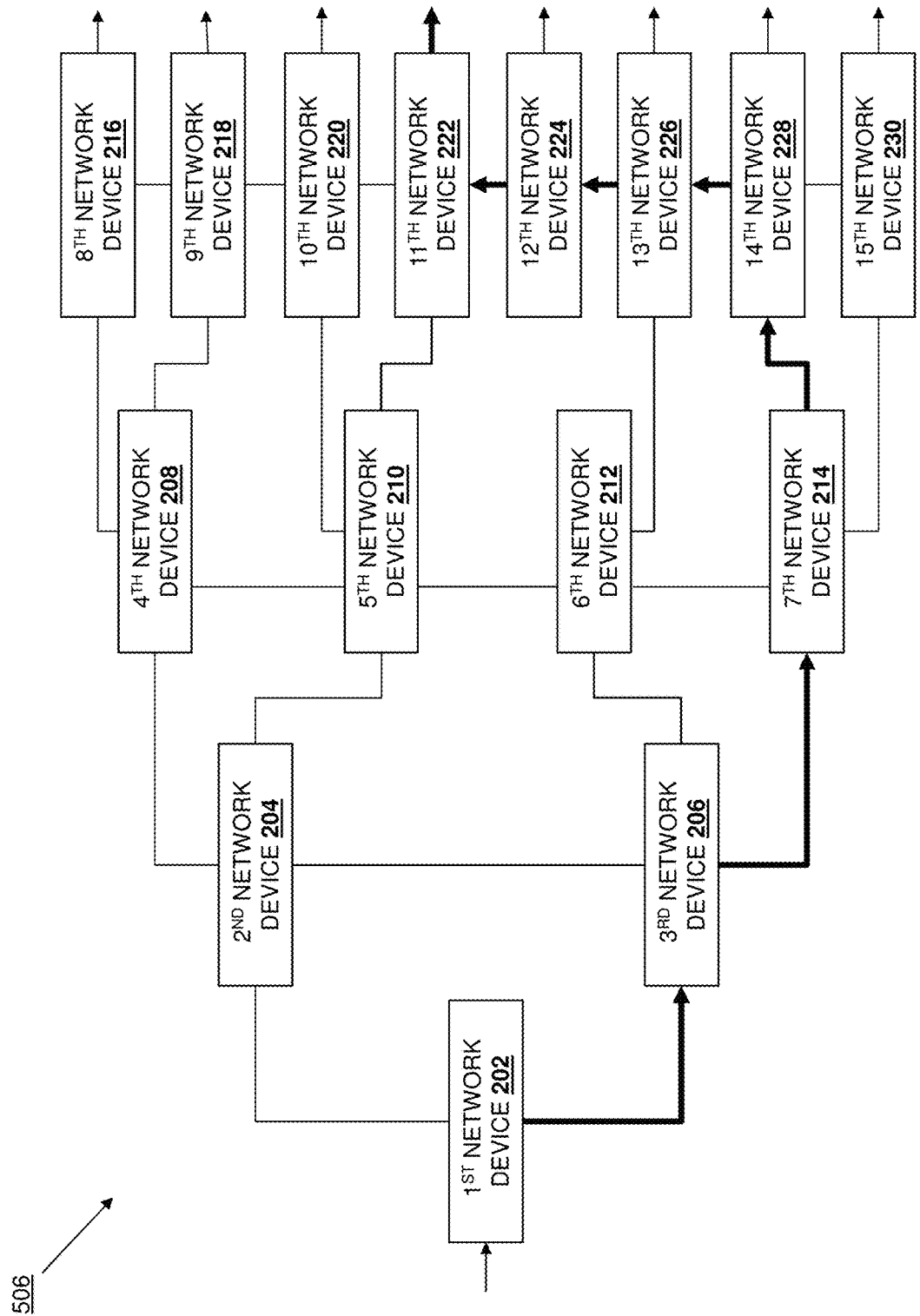
FIG. 5d is a schematic view illustrating an embodiment of a fourth data path through the shutdown response system of FIG. 2.

While the discussion above with reference to decision block 410 implies that only a single alternate data path is determined for the first data traffic flow, in some embodiments, multiple alternate data paths may be determined for any data traffic flow. For example, FIG. 5c illustrates a third data path 504 for the first data traffic flow from the first network device 202 that includes the coupling 202/206, the third network device 206, the coupling 206/212, the sixth network device 212, the coupling 212/226, the thirteenth network device 226, the coupling 226/224, the twelfth network device 224, the coupling 224/222, and the eleventh network device 222 (which is configured to send that first data traffic flow on to its destination). Similarly, FIG. 5d illustrates a fourth data path 506 for the first data traffic flow from the first network device 202 that includes the coupling 202/206, the third network device 206, the coupling 206/214, the seventh network device 214, the coupling 214/228, the fourteenth network device 228, the coupling 228/226, the thirteenth network device 226, the coupling 226/224, the twelfth network device 224, the coupling 224/222, and the eleventh network device 222 (which is configured to send that first data traffic flow on to its destination). In some embodiments, the first network device 202 may determine the second data path 502, the third data path 504, and the fourth data path 506 (and other data paths) based solely on the shutdown response notification received from the second network device 204, while in other embodiments, the first network device 202 may determine the second data path 502, the third data path 504, and the fourth data path 506 (and other data paths) based on shutdown response notifications received from other network devices (e.g., the fifth network device 210 and/or the sixth network device 212), as discussed in further detail below. One of skill in the art in possession of the present disclosure will recognize that a variety of different numbers of data paths may be determined depending on the network topology while remaining within the scope of the present disclosure.

Following the determination of the second data path 502 (and any other data paths) at block 412, the protocol engine 304b in the first network device 202 stores the second data path 502 (and/or other data paths) in the path database 310, and continues to send the first data traffic flow along the first data path 500 that includes the second network device 204. As discussed below, the second data path 502 (and/or other data paths) are not used for the first data traffic flow following block 412 unless it is determined that the second network device 204 has shut down or will imminently shut down, and thus the first data path 500 will be used for the first data traffic flow up until such a determination. In an embodiment, the first network device 202 may start a timer or otherwise note the time the second data path 502 (and/or other data paths) were created at block 412 for use in determining whether the second data path 502 (and/or other data paths) should be removed from the path database 310, discussed in further detail below.

The method 400 then proceeds to decision block 414 where it is determined whether the shutdown response notification(s) are indicative of an imminent shutdown. As discussed below, the shutdown engine 304a in the second network device 204 may send a plurality of shutdown response notifications to the first network device 202 prior to the shutdown condition in the second network device 204 reaching the shutdown threshold. In such embodiments, the shutdown engine 304a in the first network device 202/300 may store any subsequent shutdown response notifications received from the second network device 204 in association with the earlier received first shutdown response notification. As such, at decision block 414, the shutdown engine 304a in the first network device 202 may analyze the plurality of shutdown response notifications to determine whether a shut down of the second network device 204 is imminent prior to the second network device 204 sending a shutdown notification, discussed in further detail below. For example, the shutdown engine 304a in the first network device 202 may determine that a plurality of shutdown response notifications received from the second network device 204 show a steadily increasing temperature that is imminently going to reach a temperature shutdown threshold, a steadily declining data transmission rate that is imminently going to reach a data transmission shutdown threshold, or a steadily increasing data error rate that is imminently going to reach a data error shutdown threshold, and in response determine that those shutdown response notification are indicative of an imminent shutdown. One of skill in the art in possession of the present disclosure will recognize that the shutdown monitoring data and times associated with imminent shutdown will vary depending on the shutdown condition and importance of the data in the first data traffic flow. For example, a temperature of the second network device 204 rising at a rate of 1° Celsius/second for critical data may result in the determination of an imminent shutdown for a shutdown threshold of 85° Celsius when shutdown monitoring data shows a temperature of 82° Celsius to ensure that none of that critical data is lost. While the determination that the shutdown response notification(s) are indicative of an imminent shutdown are described as involving multiple shutdown response notification, in some embodiments the determination of the imminent shutdown may be made using a single shutdown response notification.

In response to determining that the shutdown response notification(s) are indicative of an imminent shutdown, the method 400 proceeds to block 424, discussed in further detail below. In response to determining that the shutdown response notification(s) are not indicative of an imminent shutdown, the method 400 proceeds to decision block 416 where it is determined whether a second data traffic flow is received at the second network device. In an embodiment, at decision block 416, the protocol engine 304b in the first network device 202 determines whether a second data traffic flow, which is a different data traffic flow than the first data traffic flow, has been received. In different embodiments, the second data traffic flow may be received by the first network device 202 from a source device, another network device (e.g., a switch or router), and/or a variety of other devices known in the art. In different embodiments, the second data traffic flow may be an application flow (e.g., data generated and sent by an application running on a device), other data generated by a source device, and/or a variety of data traffic known in the art. If it is determined that no second data traffic flow has been received at decision block 416, the method proceeds to decision block 420, discussed in further detail below.

Referring now to FIG. 4c, if at decision block 416 it is determined that a second data traffic flow has been received, the method 400 proceeds to block 418 where the second network device determines a third data path for the second data traffic flow that does not include the first network device, and the second network device forwards the second data traffic flow along the third data path. In an embodiment, when the protocol engine 304b in the first network device 202 determines that a second data traffic flow has been received, the protocol engine 304b ay determine a data path through the network that does not include the second network device 204 (that has sent at least one shutdown response notification). For example, at block 418, the protocol engine may determine the second data path 502 illustrated in FIG. 5b, the third data path 504 illustrated in FIG. 5c, the fourth data path 506 illustrated in FIG. 5d, and/or a variety of other data paths that do not include the second network device 204, and then send the second data traffic flow along that data path such that the second data traffic flow is not handled by the second network device 204.

As such, in some embodiments, in response to the "health" of the second network device 204 decreasing but prior to shutdown of the second network device 204 (as indicated by one or more shutdown response notifications sent by the second network device 204), the first network device 202 may send new data traffic flows (i.e., data traffic flows received subsequent to receiving the shutdown response notification(s) from the second network device 204) through the network along data paths that do not include the second network device 204. In specific embodiments, this allows the first network device 202 to make load balancing decisions based on the health of the second network device 204 (and/or other network devices) such that, if a subsequent shutdown of the second network device 204 occurs, fewer data traffic flows will be effected and subject to rerouting and/or data/packet loss. In some embodiments, rather than sending all new data traffic flows along data paths that do not include the second network device 204, the first network device 202 may skew the distribution of new data traffic flows along data paths that do not include the second network device 204, but may still send some data traffic flows along data paths that include the second network device 204. For example, such skewing decisions may be based on the health of the second network device 204 using the received shutdown response notifications (e.g., routing more data traffic flows "around" the second network device 204 if relatively more shutdown response notifications are received, shutdown response notifications are received that include shutdown monitoring data that is relatively close to the shutdown threshold, etc.)

Following block 418, or in response to determining that no second data traffic flow has been received, the method 400 proceeds to decision block 420 where it is determined whether a shutdown condition in the first network device is at a shutdown threshold. In an embodiment, the shutdown engine 304a in the second network device 204 may communicate with the shutdown monitoring device 306 to receive or retrieve shutdown monitoring data as described above, and use the shutdown details in the shutdown database 308 discussed above to determine whether the shutdown monitoring data indicates that the second network device 204/300 is at its shutdown threshold. If the shutdown engine 304a determines that the shutdown monitoring data indicates that the second network device 204/300 is not at its shutdown threshold, the method 400 returns to block 402 where the network devices operate as described above. As such, if the shutdown condition in the second network device 204 does not reach its shutdown threshold but remains in the shutdown notification range, the second network device 204 may continue to send shutdown response notifications at block 408. If the shutdown engine 304a determines that the shutdown monitoring data indicates that the second network device 204/300 is at its shutdown threshold, the method 400 proceeds to block 422, discussed in further detail below.

In an embodiment, at decision block 420 the shutdown engine 304a may poll a temperature shutdown monitoring device 306 (e.g., a temperature sensor) to retrieve temperature shutdown monitoring data (e.g., a current temperature of the switch, a component in the switch, or a component coupled to the switch), and then compare that temperature shutdown monitoring data to the temperature shutdown condition(s) in the shutdown database 308. If the shutdown engine 304a determines that the temperature shutdown monitoring data is at or exceeds the temperature shutdown threshold of the second network device 204/300, the method 400 proceeds to block 420. Using the example discussed above, if the shutdown engine 304a retrieves a temperature of the switch, a component in the switch, or a component that is coupled to the switch that is 85° Celsius (i.e., at the 85° Celsius shutdown range), the method 400 proceeds to block 422.

In an embodiment, at decision block 406 the shutdown engine 304a may poll a data transmission shutdown monitoring device 306 (e.g., a port monitor) to retrieve data transmission shutdown monitoring data (e.g., a data transmission rate of the switch, a port in the switch, or a port coupled to the switch), and then compare that data transmission shutdown monitoring data to the data transmission shutdown condition(s) in the shutdown database 308. If the shutdown engine 304a determines that the data transmission shutdown monitoring data is at the data transmission shutdown threshold of the second network device 204/300, the method 400 proceeds to block 422. Using the example discussed above, if the shutdown engine 304a retrieves a data transmission rate of the switch, a port in the switch, or a port coupled to the switch that is below the shutdown range), the method 400 proceeds to block 422.

In an embodiment, at decision block 406 the shutdown engine 304a may poll a data error shutdown monitoring device 306 (e.g., a port monitor) to retrieve data error shutdown monitoring data (e.g., a data error rate of the switch, a port in the switch, or a port coupled to the switch), and then compare that data error shutdown monitoring data to the data error shutdown condition(s) in the shutdown database 308. If the shutdown engine 304a determines that the data error shutdown monitoring data is at the data error shutdown threshold of the second network device 204/300, the method 400 proceeds to block 422. Using the example discussed above, if the shutdown engine 304a retrieves a data error rate of the switch, a port in the switch, or a port coupled to the switch that is above the shutdown range), the method 400 proceeds to block 422.

If at decision block 420 it is determined that the first network device is at its shutdown threshold, the first network device sends a shutdown notification to the second network device. In an embodiment, in response to determining that the shutdown condition in the second network device 204/300 is at its shutdown threshold, the shutdown engine 304a in the second network device 204 sends a shutdown notification through the communication system 302 to the first network device 202 (e.g., via the coupling 202/204). The shutdown notification may include an indication that the shutdown condition is at the shutdown threshold, the shutdown monitoring data, the shutdown threshold, an identifier for the data traffic flow being received and forwarded (e.g., an identifier for the first data traffic flow being received and forwarded by the second network device 204) and/or any other information related to the shutdown condition for which the shutdown notification is being sent. In an embodiment, the shutdown notification may be send using protocols such as, for example, the LLDP, the LACP, and/or using a variety of other protocol or communication methods known in the art. For example, the information in the shutdown notification may be sent in a TLV element of the data communication protocol used to send the shutdown notification. At block 422, the protocol engine 304b in the first network device 202 receives the shutdown notification.

Following block 422, or in response to determining at decision block 414 that the shutdown response notification(s) are indicative of an imminent shutdown, the method 400 proceeds to block 424 where the second network device sends the first data traffic along the second data path. With reference to FIGS. 5a-d, in response to the protocol engine 304b in the first network device 202 receiving the shutdown notification from the second network device 204 (or determining that shutdown response notification(s) are indicative of an imminent shutdown of the second network device 204), the protocol engine 204b operates to stop sending the first data traffic flow along the first data path 500 illustrated in FIG. 5a, and begins sending the first data traffic flow along the second data path 502 illustrated in FIG. 5b (or the third data path illustrated in FIG. 5c, the fourth data path 506 illustrated in FIG. 5d, or other alternate data paths determined for the first data traffic flow.) Due to the determination of the second data path (and/or other data paths) for the first data traffic flow prior to receiving the shutdown notification from (or determining the imminent shutdown of) the second network device 204, the switchover from the sending the first data traffic flow along the first data path to sending the first data traffic flow along the second data path is relatively quick (i.e., compared to conventional systems which would need to determine a new data path subsequent to receiving the shutdown notification from the second network device 204), and results in little to no data or packet loss. For example, it has been found that the determination of new data paths can take upward of a few seconds, while the switchover to previously determined alternate data paths takes less than a second and can be on the order of milliseconds.

Figure 5E:
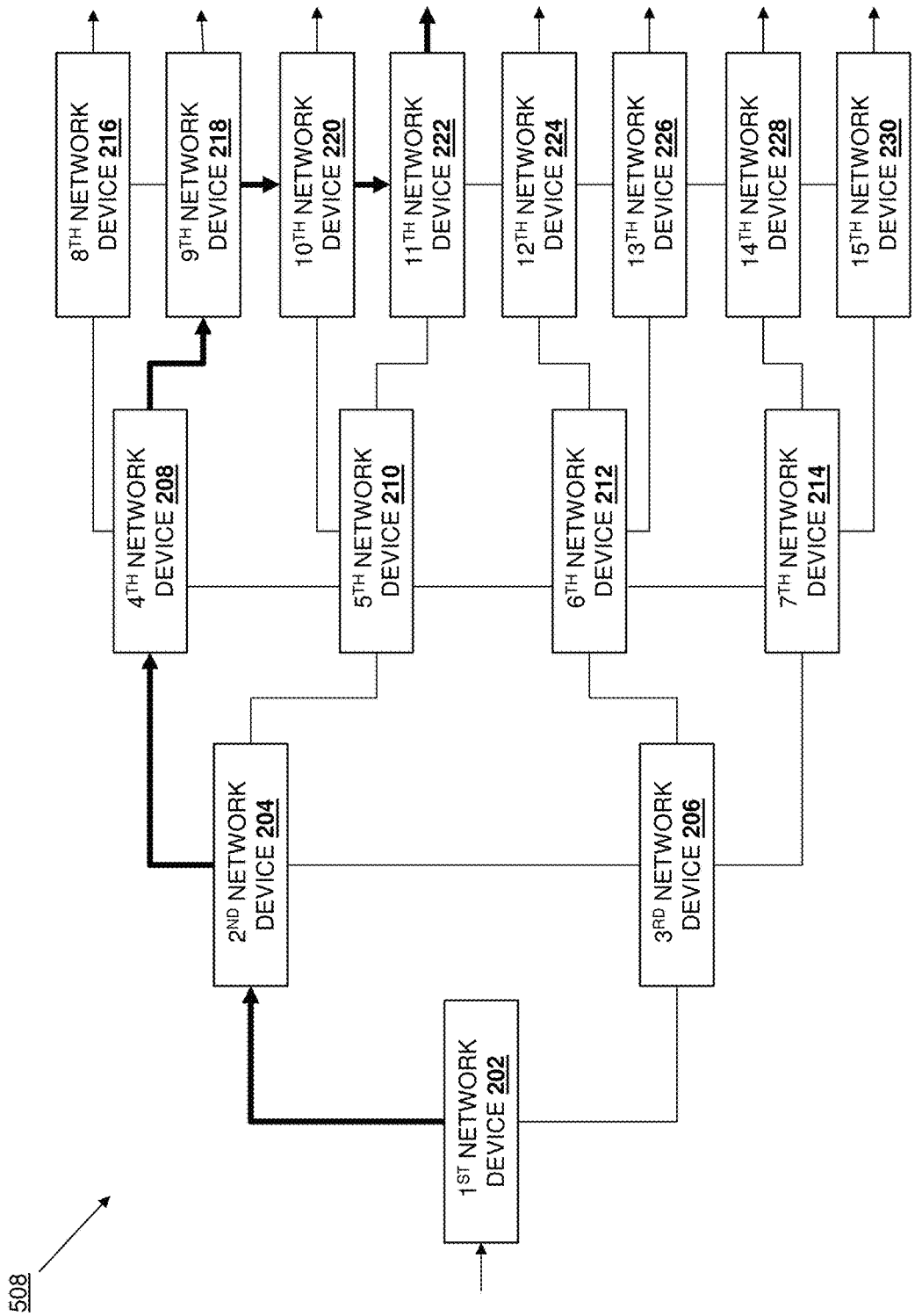
FIG. 5e is a schematic view illustrating an embodiment of a fifth data path through the shutdown response system of FIG. 2.

With reference now to FIGS. 5a, 5b, 5e, 5f, and 5g, a few examples of other network devices in the shutdown response system 200 operating as the "second network device" that responds to a "first network device" sending shutdown response notifications are provided. For example, FIGS. 5a and 5e illustrate the second network device 204 operating as the "second network device" and the fifth network device 210 operating as the "first network device" discussed in the method 400, with the second network device 204 finding an alternate data path to the first data path 500 that includes the fifth network device 210. As such, in response to declining health of the fifth network device 210, the second network device 204 has determined a fifth data path 508 that includes the coupling 204/208, the fourth network device 208, the coupling 208/218, the ninth network device 218, the coupling 218/220, the tenth network device 220, the coupling 220/222, and the eleventh network device 222 (which is configured to send that first data traffic flow on to its destination).

Figure 5F:
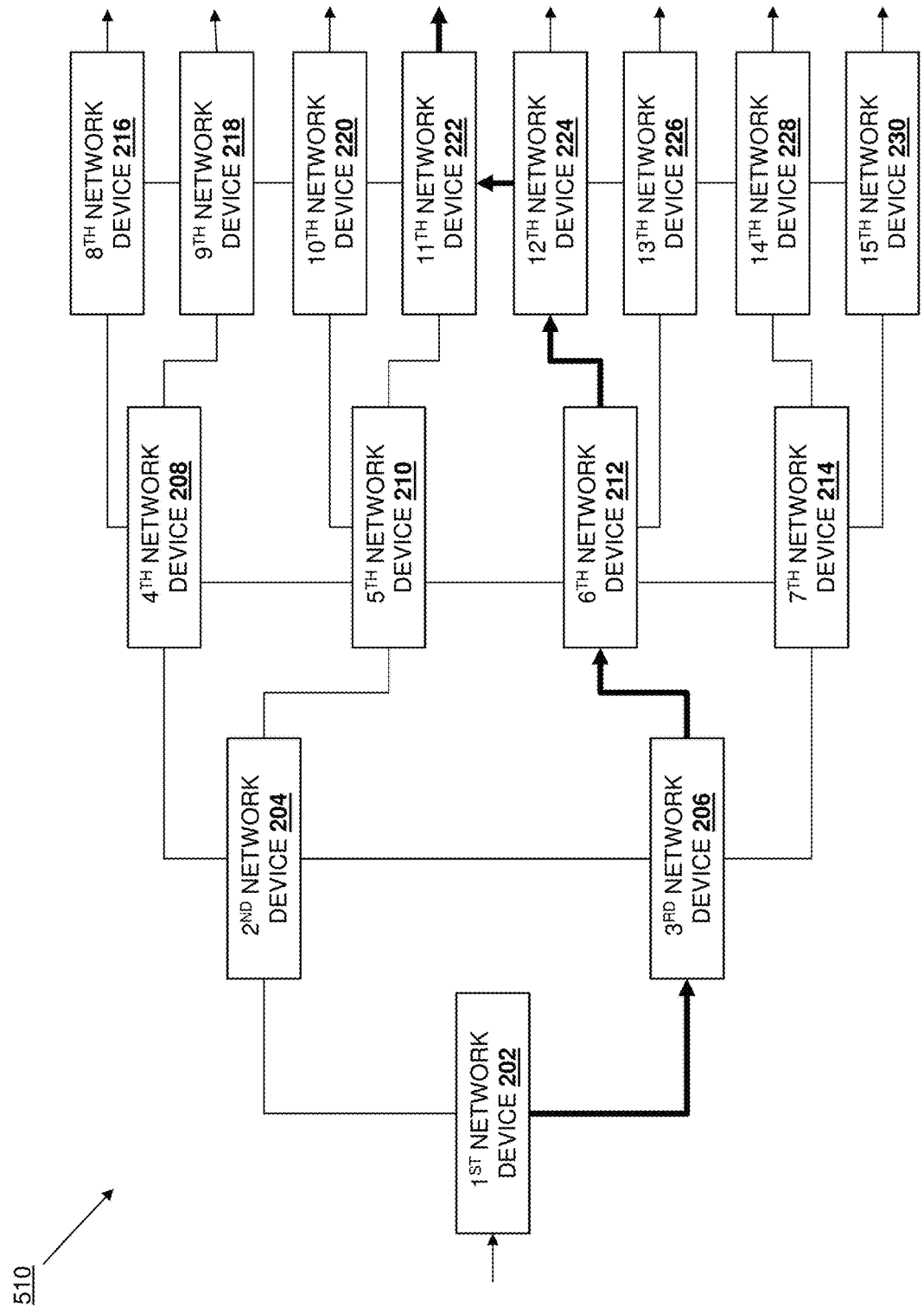
FIG. 5f is a schematic view illustrating an embodiment of a sixth data path through the shutdown response system of FIG. 2.
Figure 5G:
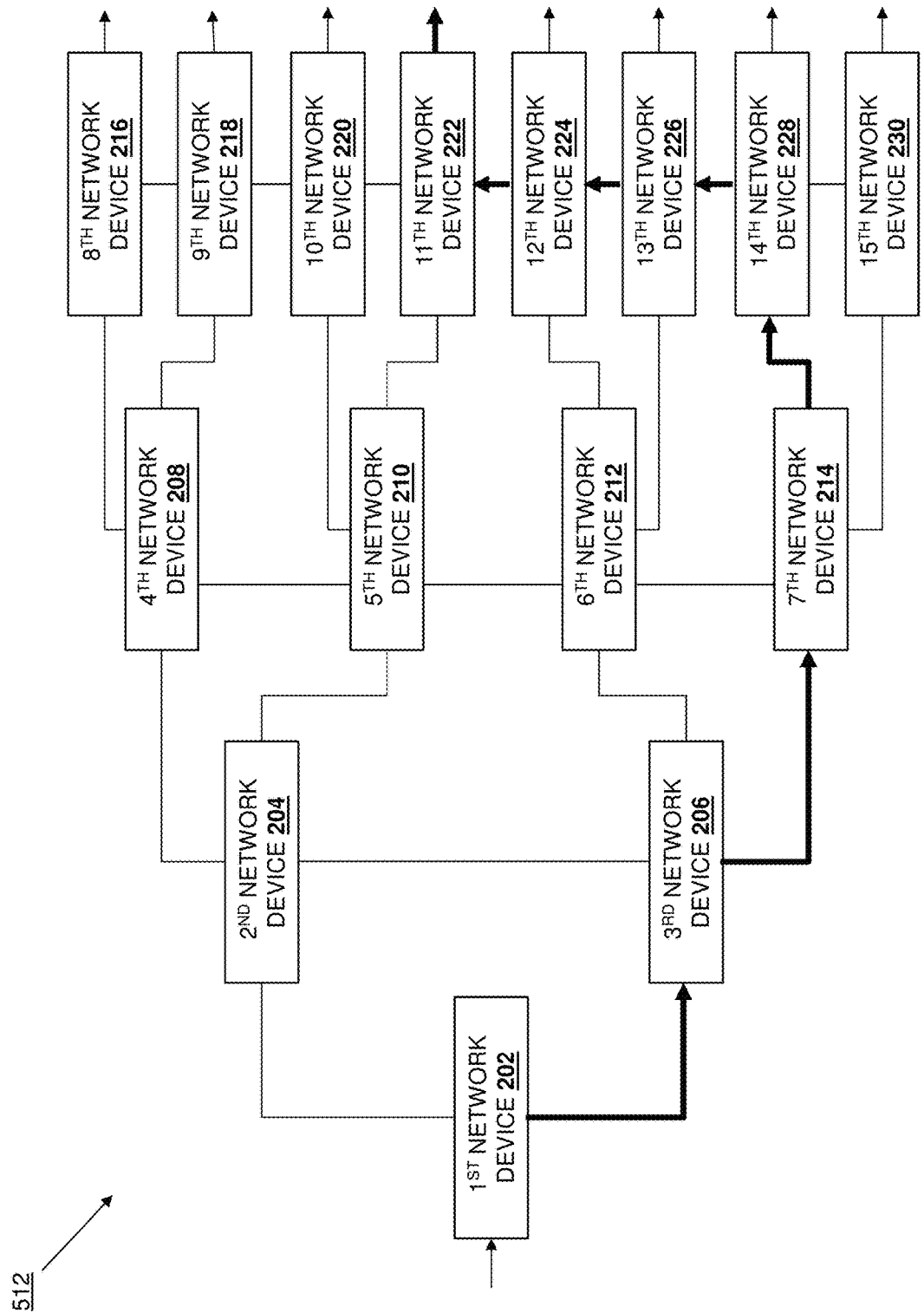
FIG. 5g is a schematic view illustrating an embodiment of a seventh data path through the shutdown response system of FIG. 2.

In another example, FIGS. 5b and 5f illustrate the sixth network device 212 operating as the "second network device" and the fifth network device 210 operating as the "first network device" discussed in the method 400, with the sixth network device 212 finding an alternate data path to the second data path 502 that includes the fifth network device 210. As such, in response to declining health of the fifth network device 210, the sixth network device 212 has determined a sixth data path 510 that includes the coupling 212/224, the twelfth network device 224, the coupling 224/222, and the eleventh network device 222 (which is configured to send that first data traffic flow on to its destination). In another example, FIGS. 5b and 5g illustrate the third network device 206 operating as the "second network device" and the sixth network device 212 operating as the "first network device" discussed in the method 400, with the third network device 206 finding an alternate data path to the second data path 502 that includes the sixth network device 212. As such, in response to declining health of the sixth network device 212, the third network device 206 has determined a seventh data path 512 that includes the coupling 206/214, the seventh network device 214, the coupling 214/228, the fourteenth network device 228, the coupling 228/226, the thirteenth network device 226, the coupling 226/224, the twelfth network device 224, the coupling 224/222, and the eleventh network device 222 (which is configured to send that first data traffic flow to its destination). While the examples of the alternate data paths in FIGS. 5e, 5f, and 5g have been discussed above as being determined by a network device directly connected to the network device with declining health, as discussed above, shutdown responses notifications may be forwarded upstream by network devices (e.g., from the second network device 204 and/or the third network device 206 to the first network device 202) so that the determination of alternate data paths may be made while considering network devices that are two or more "hops" away from the network device making the determination.

Thus, systems and methods have been described that notify network devices of shutdown conditions in other network devices with diminishing health ("failing network devices") prior to those shutdown conditions reaching a shutdown threshold, which allows the network devices to determine and store alternate data paths for data traffic flows that are currently being handled by the failing network devices, as well as send new data traffic flows along data paths that do not include the failing network devices. The determination of those alternate data paths prior to the shutdown or imminent shutdown of the failing network devices allows for the data paths of data traffic flows to be switched quickly when the shutdown condition in the failing network devices reaches its shutdown threshold, reducing data traffic losses relative to conventional shutdown response systems. Furthermore, the ability to make data traffic flow routing decisions based on the knowledge of the failing network devices further reduces data traffic losses in the network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A shutdown response system, comprising:
a first network device that is coupled to a network and that is configured to:
  receive a first data traffic flow through the network and forward the first data traffic flow through the network;
  determine that shutdown monitoring data for the first network device is within a predetermined shutdown notification range that is defined between a failing network device threshold that is indicative of a failing network device and a predetermined shutdown threshold that is associated with a shutdown condition, wherein the first network device forwards the first data traffic flow prior to the shutdown monitoring data reaching the predetermined shutdown threshold, and wherein the first network device shuts down in response to the shutdown monitoring data reaching the predetermined shutdown threshold such that the first network device cannot forward any data traffic;
  send, in response to determining that the shutdown monitoring data for the first network device is within the predetermined shutdown notification range, a first shutdown response notification over the network; and
  send at least one second shutdown response notification through the network subsequent to sending the first shutdown response notification and in response to determining that the shutdown monitoring data is within the predetermined shutdown notification range without having reached the predetermined shutdown threshold; and
a second network device that is coupled to the network and that is configured to:
  send the first data traffic flow through the network along a first data path that includes the first network device;
  receive the first shutdown response notification from the first network device through the network and, in response, determine a second data path for sending the first data traffic flow through the network that does not include the first network device;
  store the second data path;
  receive the at least one second shutdown response notification through the network from the first network device; and
  send, in response to determination that the first shutdown response notification and the at least one second shutdown response notification are indicative of an imminent shutdown of the first network device, the first data traffic flow through the network along the second data path.

2. The shutdown response system of claim 1, wherein the first network device is configured to:
detect that the shutdown monitoring data has reached the predetermined shutdown threshold subsequent to sending the first shutdown response notification and the at least one second shutdown response notification and, in response, send a shutdown notification over the network to the second network device, wherein the shutdown notification indicates the first network device will shut down.

3. The shutdown response system of claim 2, wherein the second network device is configured to:
receive the shutdown notification, and
send, in response to receiving the shutdown notification and after determining that the first shutdown response notification and the at least one second shutdown response notification are not indicative of an imminent shutdown of the first network device, the first data traffic flow through the network along the second data path.

4. The shutdown response system of claim 1, wherein the second network device is configured to:
receive a second data traffic flow subsequent to receiving the first shutdown response notification and, in response, determine a third data path for sending the second data traffic flow through the network that does not include the first network device; and
send the second data traffic flow through the network along the third data path.

5. The shutdown response system of claim 1, wherein the second network device is configured to:
store the at least one second shutdown response notification in association with the first shutdown response notification.

6. The shutdown response system of claim 1, wherein the first data path and the second data path are determined by the second network device using a topology-based routing protocol.

7. An information handling system (IHS), comprising:
a communication system that is configured to couple to a network;
a processing system that is coupled to the communication system; and
a memory system that is coupled to the processing system and that includes instructions that, when executed by the processing system, cause the processing system to provide a shutdown response engine that is configured to:
send, using the communication system, a first data traffic flow through the network along a first data path that includes a first network device that is coupled to the network;
receive, using the communication system, a first shutdown response notification from the first network device through the network, wherein the first shutdown response notification is associated with shutdown monitoring data for the first network device being within a predetermined shutdown notification range that is defined between a failing network device threshold that is indicative of a failing network device and a predetermined shutdown threshold that is associated with a shutdown condition, wherein the first network device forwards the first data traffic flow prior to the shutdown monitoring data reaching the predetermined shutdown threshold, and wherein the first network device shuts down in response to the shutdown monitoring data reaching the predetermined shutdown threshold such that the first network device cannot forward any data traffic;
determine, in response to receiving the first shutdown response notification, a second data path for sending the first data traffic flow through the network that does not include the first network device;
store, in the memory system, the second data path;
receive, using the communication system, at least one second shutdown response notification through the network from the first network device, wherein the at least one second shutdown response notification is received subsequent to the receiving of the first shutdown response notification and is associated with the shutdown monitoring data for the first network device being within the predetermined shutdown notification range without having reached the predetermined shutdown threshold; and
send, in response to determining that the first shutdown response notification and the at least one second shutdown response notification are indicative of an imminent shutdown of the first network device, the first data traffic flow through the network along the second data path.

8. The IHS of claim 7, wherein the shutdown response engine is configured to:
receive, using the communication system, a shutdown notification from the first network device through the network, wherein the shutdown notification indicates that the first network device will shut down, is received subsequent to receiving the first shutdown response notification and the at least one second shutdown response notification, and is associated with the shutdown monitoring data of the first network device having reached the predetermined shutdown threshold for the first network device; and
send, using the communication system and in response to receiving the shutdown notification and after determining that the first shutdown response notification and the at least one second shutdown response notification are not indicative of an imminent shutdown of the first network device, the first data traffic flow through the network along the second data path.

9. The IHS of claim 7, wherein the shutdown response engine is configured to:
receive, using the communication system, a second data traffic flow subsequent to receiving the first shutdown response notification and, in response, determine a third data path for sending the second data traffic flow through the network that does not include the first network device; and
send, using the communication system, the second data traffic flow through the network along the third data path.

10. The IHS of claim 7, wherein the shutdown response engine is configured to:
store, in the memory system, the at least one second shutdown response notification in association with the first shutdown response notification.

11. The IHS of claim 7, wherein the shutdown response engine includes a topology-based routing protocol engine that is configured to determine the first data path and the second data path.

12. A method for responding to a shutdown, comprising:
sending, by a second network device, a first data traffic flow through a network along a first data path that includes a first network device;
receiving, by the second network device from the first network device, a first shutdown response notification through the network, wherein the first shutdown response notification is associated with shutdown monitoring data for the first network device being within a predetermined shutdown notification range that is defined between a failing network device threshold that is indicative of a failing network device and a predetermined shutdown threshold that is associated with a shutdown condition for the first network device, wherein the first network device forwards the first data traffic flow prior the shutdown monitoring data reaching the predetermined shutdown threshold, and wherein the first network device shuts down in response to the shutdown monitoring data reaching the predetermined shutdown threshold such that the first network device cannot forward any data traffic;
determining, by the second network device in response to receiving the first shutdown response notification, a second data path for sending the first data traffic flow through the network that does not include the first network device;
storing, by the second network device, the second data path;
receiving, by the second network device from the first network device, at least one second shutdown response notification through the network; and
sending, by the second network device in response to determining that the first shutdown response notification and the at least one second shutdown response notification are indicative of an imminent shutdown of the first network device, the first data traffic flow through the network along the second data path.

13. The method of claim 12, further comprising:
receiving, by the second network device from the first network device, a shutdown notification through the network, wherein the shutdown notification indicates that the first network device will shut down, is received subsequent to receiving the first shutdown response notification and the at least one second shutdown response notification, and is associated with the shutdown monitoring data of the first network device having reached the predetermined shutdown threshold for the first network device; and
sending, by the second network device in response to receiving the shutdown notification and alter determining that the first shutdown response notification and the at least one second shutdown response notification are not indicative of an imminent shutdown of the first network device, the first data traffic flow through the network along the second data path.

14. The method of claim 12, further comprising:
receiving, by the second network device, a second data traffic flow subsequent to receiving the first shutdown response notification and, in response, determining a third data path for sending the second data traffic flow through the network that does not include the first network device; and
sending, by the second network device, the second data traffic flow through the network along the third data path.

15. The method of claim 12, further comprising:
storing, by the second network device, the at least one second shutdown response notification in association with the first shutdown response notification.

16. The method of claim 12, wherein the first data path and the second data path are determined by the second network device using a topology-based routing protocol.

* * * * *

UNITED STATES PATENT AND TRADEMARK OFFICE
CERTIFICATE OF CORRECTION

PATENT NO. : 9,866,469 B2
APPLICATION NO. : 14/715260
DATED : January 9, 2018
INVENTOR(S) : Sudharsan Dhamal Gopalarathnam Page 1 of 1

It is certified that error appears in the above-identified patent and that said Letters Patent is hereby corrected as shown below:

In the Claims

In Claim 13, Column 21, Line 13: please replace "alter" with --after--

Signed and Sealed this
Tenth Day of July, 2018

Andrei Iancu
*Director of the United States Patent and Trademark Office*